United States Patent [19]
Douglas

[11] 3,930,470
[45] Jan. 6, 1976

[54] VAPOR INJECTION SYSTEM FOR INTERNAL COMBUSTION ENGINE

[76] Inventor: Beverly Douglas, 425 Sunnyside Drive, Nashville, Tenn. 37205

[22] Filed: Jan. 30, 1974

[21] Appl. No.: 438,024

[52] U.S. Cl. .......... 123/25 A; 123/25 E; 123/25 M; 261/98
[51] Int. Cl.² ........................................ F02D 19/00
[58] Field of Search ..... 123/25 A, 25 E, 25 J, 25 L, 123/25 M, 25 N, 26, 141, 27 R; 261/98, 18 A

[56] References Cited
UNITED STATES PATENTS

| 1,304,019 | 5/1919 | Brown | 123/25 A X |
| 1,316,953 | 9/1919 | Hodges | 123/25 A |
| 1,330,574 | 2/1920 | Barksdale | 123/25 A |
| 1,964,892 | 7/1934 | Novotny | 123/25 A |
| 3,019,777 | 2/1962 | Candelise | 123/26 |
| 3,655,169 | 4/1972 | Goldfarb | 123/25 A X |
| 3,834,360 | 9/1974 | Blitch | 123/25 A |

Primary Examiner—Charles J. Myhre
Assistant Examiner—Ira S. Lazarus
Attorney, Agent, or Firm—Harrington A. Lackey

[57] ABSTRACT

A vapor injection system for an internal combustion engine including a mist chamber having a perforated section communicating with the inlet to the carburetor and a water tube and an air tube discharging jets of water and air, respectively, in convergent paths within the mist chamber to create an atomized water spray. The perforated section of the mist chamber assures the complete atomization of all water particles passing into the carburetor.

5 Claims, 6 Drawing Figures

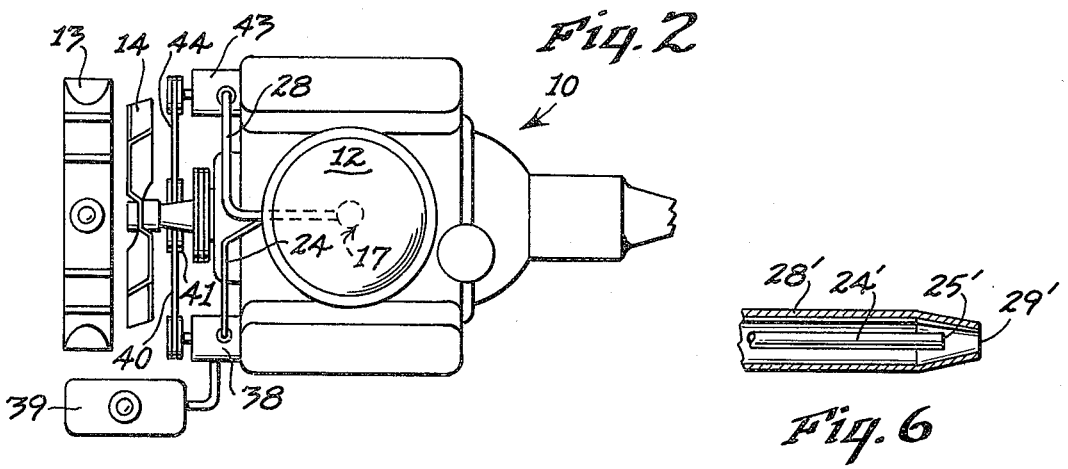
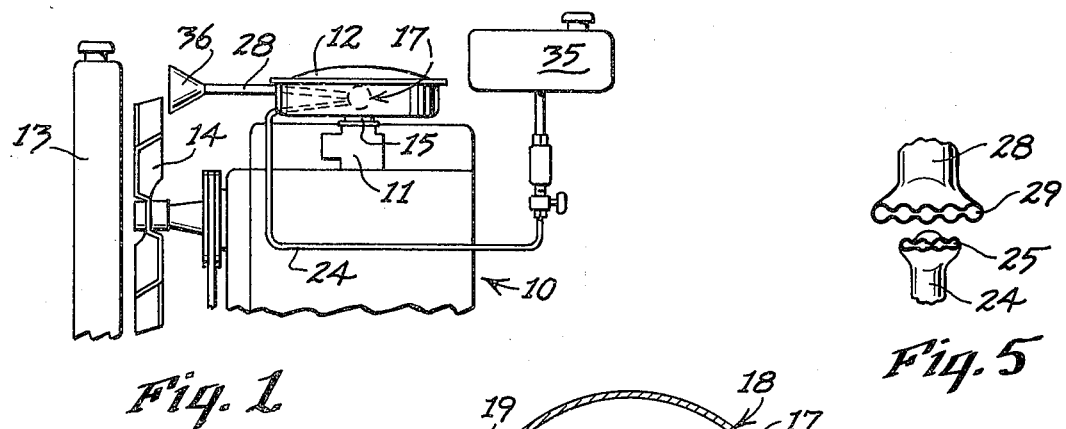
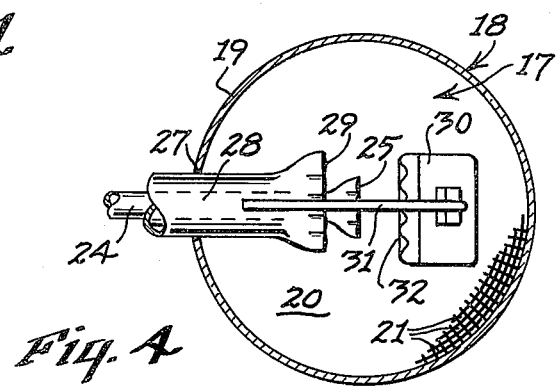
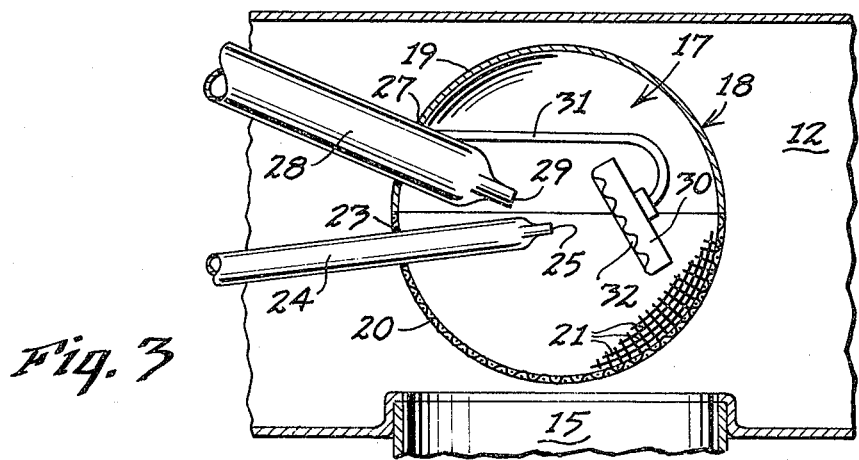

VAPOR INJECTION SYSTEM FOR INTERNAL COMBUSTION ENGINE

BACKGROUND OF THE INVENTION

This invention relates to an internal combustion engine, and more particularly to a vapor injection system for an internal combustion engine.

Water vapor injection of internal combustion engines is old, as evidenced by the applicant's prior U.S. Pat. No. 1,373,603 issued Apr. 5, 1921.

However, in the injection of water vapor into the carburetors of internal combustion engines, water droplets of excessive size too often pass into the carburetor, thereby decreasing the efficiency of the engine. The smaller the droplets, the more readily the water will flash into superheated steam when the water vapor is introduced into the engine cylinders.

SUMMARY OF THE INVENTION

It is therefore an object of this invention to provide a water vapor injection system for an internal combustion engine in which the water is completely vaporized into a fine mist before entering the carburetor.

The water vapor injection system made in accordance with this invention includes a completely closed mist chamber, at least a portion of which constitutes a perforated or screened wall having apertures of small enough size to permit passage only of water particles in a mist or vapor form.

Water and compressed air are introduced into the mist chamber through corresponding tubes which discharge in intercepting paths in order to break up the water particles into a spray or mist. The water may be fed through the water tube under pressure by gravity feed or by a driven water pump. The air may be fed through the air tube by a scoop or funnel member facing forward of the motor vehicle incorporating the vapor injection system. The forward movement of the vehicle will force the air into the funnel member, where the air is compressed by the decreasing cross-sectional area of the funnel member. The compressed air may also be supplied by a driven air compressor.

Where a driven water pump and a driven air compressor are employed, the pump and the compressor may be driven in timed relation with the engine by mechanical connection to the cam shaft, the crankshaft or to any of the other moving parts of the engine, including one of the rotating fan belts.

In a preferred form of the invention, a baffle having a roughened or corrugated face is mounted at an angle opposing the stream of water discharging from the water tube into the mist chamber, not only to further break up the water particles, but also to direct the stream through the perforated section of the mist chamber into the carburetor.

BRIEF DESCRIPTION OF THE DRAWINGS

FIG. 1 is a fragmentary side elevation of an internal combustion engine of a motor vehicle disclosing one form of the vapor injection system;

FIG. 2 is a top plan view of the engine and vapor injection system disclosed in FIG. 1, in which modified means are disclosed for supplying the water and air;

FIG. 3 is an enlarged fragmentary sectional elevation of the air cleaner of the engine with parts of the vapor injection system mounted therein;

FIG. 4 is a fragmentary plan section taken through the mist chamber;

FIG. 5 is a fragmentary end view of the discharge end portions of the water tube and air tube; and FIG. 6 is a fragmentary sectional elevation of a modified form of air tube and water tube.

DESCRIPTION OF THE PREFERRED EMBODIMENT

Referring now to the drawings in more detail, FIGS. 1 and 2 disclose an internal combustion engine 10 of a motor vehicle including a carburetor 11, an air cleaner 12, a radiator 13 and a fan 14. The air cleaner 12 is connected to the carburetor 11 through an air inlet conduit 15.

The above-described parts are, of course, conventional in internal combustion engines for motor vehicles.

The vapor injection system made in accordance with this invention includes a mist chamber 17 having a complete enclosure wall 18, disclosed in a globular or spherical shape.

As disclosed in FIG. 3, the upper hemispherical portion of the wall 18 is solid, preferably a solid metal, while the lower hemispherical portion 20 is a perforated section or screen section including a plurality of small apertures or fine mesh 21. The mist chamber 17 is preferably mounted in a fixed position within the air cleaner 12, by means, such as brackets, not shown, so that water vapor generated within the mist chamber 17 will pass through the perforated section 20 into the inlet conduit 15, and subsequently into the carburetor 16.

Projecting through an opening 23 in the wall 18 of the mist chamber 17 is a water tube 24 having an open discharge end or orifice 25 within the mist chamber 17. Mounted to project through another opening 27 in the wall 18 of the mist chamber 17 is an air tube 28 having an open discharge end or orifice 29 also within the mist chamber 17 but terminating in a position proximate to the discharge end 25 of the water tube 24. The discharge orifice 29 should be so positioned that it discharges a jet of compressed air across or intercepting the stream of water discharging from the orifice 25, so that the water stream is broken up, or atomized, to fine water particles, mist or vapor.

In a preferred form of the invention, a baffle member 30 is mounted by any convenient means such as bracket 31 to the air tube 28 so that the baffle member 30 constitutes a barrier opposing the discharging stream of atomized water from the discharge orifice 25, as illustrated in FIG. 3. The baffle member is preferably roughened or corrugated to have a rough or undulating surface 32, which further breaks up or atomizes any water droplets which are too large, or which have not been properly atomized by the air jet from the discharge orifice 29. The baffle member 30 is also disposed at an angle to the direction of the water stream so that the atomized particles of water are deflected, preferably downward, through the perforated section 20. The upper hemispherical solid wall section 19 also functions as a deflector for the water particles to force all the water particles down through the perforated section 20.

Each of the discharge orifices 25 and 29 is preferably of smaller cross-section than the remaining cross-section of the corresponding water tube 24 and air tube 28, in order to create a venturi effect at each discharge orifice to accelerate the speed of the discharging water stream and air jet.

As disclosed in FIGS. 3, 4 and 5, the orifices 25 and 29 are made smaller by pinching to provide elongated flat discharge ends. The discharge orifices 25 and 29 may be further corrugated to provide even stronger multiple jets of water and air, which will create greater force for breaking up the particles of water in the stream discharging from the orifice 25. Also, the flattened discharge ends 25 and 29 are preferably parallel and in widthwise registry with each other so that the air jet will impinge upon the entire width of the water stream.

FIG. 6 discloses a modified form of water tube 24' of smaller diameter than the air tube 28', with the water tube 24' being mounted concentrically within the air tube 28', leaving sufficient annular space within the air tube 28' around the exterior water tube 24' to permit adequate and rapid axial flow of the compressed air. Furthermore, the air tube 28' is constricted at its discharge end 29' not only to increase the speed of the discharging air jet, but also to provide a frustoconical deflector for forcing the air stream into the discharging water stream. In this connection, it will be noted that the discharge end 25' of the water tube 24' is spaced axially behind, or within, the air discharge end 29'.

In the form of the invention disclosed in FIG. 1, water is supplied to the water tube 24 by gravity feed from a water tank 35 which may be mounted in any convenient position above the water discharge end 25 to provide a sufficient water head, and therefore sufficient water pressure, to force the water through the tube 24 and through the constricted discharge orifice 25.

The air tube 28, in the modification disclosed in FIG. 1 is provided with a funnel member or air scoop 36, having a frusto-conical shape diverging forward of the motor vehicle. As the motor vehicle moves forward, air trapped in the funnel member 36 is compressed and forced rapidly through the much smaller air tube 28, and then discharged with even greater velocity through the constricted discharge orifice 29. Preferably, the funnel member 36 is mounted immediately behind the fan 14 in order to further increase both the volume and velocity of the air fed to the funnel member 36. Although a portion of the funnel member 36 is disclosed in FIG. 1 as elevated above the fan 14, preferably the upper portion of the path of the blade tips of the fan 14 should be above the upper portion of the funnel member 36. Thus, all of the air stream entering the funnel member 36 will be forced into the funnel member 36 by the fan 14, so that the air supply through the air tube 28 is proportional to the speed of the fan 14, and therefore to the speed of the engine 10.

It is also desirable for the funnel member 36 to be mounted upon the front end of the air tube 28 by a telescoping section, for longitudinal adjustment of the funnel member 36 relative to the fan 36.

In FIG. 2, the water vapor injection system includes the same elements as those disclosed in FIGS. 1 and 3–5, with the exception of the means for supplying water to the water tube 24 and compressed air to the air tube 28. In FIG. 2, the water tube 24 is connected to a water tank or reservoir 39. Although the water pump 38 may be driven by a motor of any convenient type, preferably it is driven in synchronism with the engine 10. In FIG. 2 a belt 40 connects the pump 38 to some rotary element associated with the engine 10, such as a pulley 41 mounted on the crankshaft, not shown. The belt 40 could also be connected to the cam shaft, if desired.

In a similar manner, the air tube 28 is connected to a rotary air compressor 43, which may also be driven by a motor of any convenient type, but is disclosed as being driven by the belt 44 connected to the same pulley or sheave 41 on the crankshaft. The air compressor 43 could also be driven from the cam shaft or any other rotary element of the engine 10. The advantage of driving the pump 38 and air compressor 43 from rotary elements of the engine 10 is that the pump 38 and compressor 43 will be synchronized with the movement of the engine 10, and therefore will supply water under pressure and compressed air in proportion to the speed of the engine, and therefore in proportion to the fuel needs of the engine.

Thus, as water is supplied to the water tube 24 under pressure and compressed air is supplied to the air tube 28, the high velocity of both the water stream and the air jet discharging from the respective orifices 25 and 29, plus the intersection of the air jet and the water stream, will produce a high degree of atomization of the water particles within the mist chamber 17.

The water particles are further exposed to a second stage of atomization by impinging against the rough surface 32 of the baffle member 30. Furthermore, after this two-stage atomization, the water particles must be sufficiently minute to pass through the apertures 21 of the screen member or perforated section 20. Accordingly, the water particles are subjected to three stages of atomization, the last stage of which will not permit the passage of any excessively large water particles into the carburetor 11.

Some of the advantages of a water vapor injection system have been previously stated in my U.S. Pat. No. 1,373,603. Such advantages include a material saving in fuel consumption, increased power, and therefore increased efficiency of the internal combustion engine, a cooler operating engine, and more complete combustion, with a consequent reduction in pollutants in the exhaust gases. These advantages also apply to the water vapor injection system made in accordance with this invention.

The vapor injection system also has the advantage of a smaller number of elements of smaller size which are more compact and more easily installed than the elements of previous water vapor injection systems.

It will be further observed that there are no moving parts in the device except where the system is modified to include the water pump 38 and air compressor 43 of FIG. 2.

The system made in accordance with this invention has actually been operated and tested and produces a fuel saving of up to 35%. In operating upon a 1968 model of a Cutlass Oldsmobile at highway speeds, the vapor injection system made in accordance with this invention has produced economies in gasoline consumption of up to 25.8 miles per gallon of regular gasoline. The test Oldsmobile operated under a load and without special tune-up, and had been driven over 76,500 miles.

It is believed that the above advantages result from several causes. An increase in power and efficiency of the engine seems to result from the increased density of fuel mixture, that is the denser water mixed with the less dense air and gasoline vapors. Because of the denser mixture, it is also believed that there is greater efficiency in the sealing of the valves to the cylinders.

It is also believed that the addition of the water into the cylinders causes the mixture to burn slower, and therefore more completely, thereby reducing the pollutants in the exhaust, increasing the torque of the engine, and making the operation of the engine more continuous and smoother.

The improved efficiency of the engine 10 is further ascribed to the generation of superheated steam from the water mist or vapor introduced into the extremely hot cylinders. The increased power of superheated steam is, of course, well-known.

The water vapor injection system of this invention is a substantial improvement over previous water vapor injection systems because of its ability to efficiently atomize the water by employing at least a two-stage atomization process, and to control the size of the vapor or mist entering the carburetor to a maximum uniform fine particle size.

What is claimed is:

1. A vapor injection system in combination with an internal combustion engine having a carburetor and an air inlet to the carburetor having a flow axis toward the carburetor, comprising:
   a. a mist chamber having an enclosure wall,
   b. at least a portion of said wall comprising a perforated section having a plurality of apertures small enough to permit the passage only of water mist particles of a predetermined size,
   c. means mounting said perforated section in fluid communication with the air inlet to said carburetor,
   d. a water tube having a first discharge end projecting through said enclosure wall so that said first discharge end is within said mist chamber,
   e. an air tube having a second discharge end projecting through said enclosure wall so that said second discharge end is within said mist chamber,
   f. said second discharge end being proximate to said first discharge end and positioned to force a stream of air to intercept at an acute angle a stream of water discharged from said first discharge end in the same general direction as said air stream,
   g. means for supplying water under pressure through said water tube,
   h. means for supplying compressed air through said air tube with sufficient pressure to atomize the intercepted stream of water from said first discharge end and to force said atomized water particles in a path at a substantial angle to the flow axis of said carburetor air inlet,
   i. a baffle member,
   j. means mounting said baffle member within said mist chamber opposing said first discharge end at an angle to, and in, the path of said atomized water particles to further atomize said water particles and to deflect said water particles at an angle to said path, through said perforated section and into said carburetor air inlet.

2. The invention according to claim 1 in which the surface of said baffle member opposing said first discharge end is rough.

3. The invention according to claim 1 in which the portion of the enclosure wall of said mist chamber opposite said perforated section is solid.

4. The invention according to claim 3 in which said solid enclosure wall portion is concave toward said carburetor air inlet for deflecting additional water particles through said perforated section into said air inlet.

5. The invention according to claim 1 in which said mist chamber is mounted above said air inlet, said perforated section forming the bottom of said mist chamber, and said barrier member is mounted above said perforated section for deflecting atomized water particles down through said perforated section.

* * * * *